Aug. 3, 1965 E. F. VYE 3,198,468
MAGNETIC CLAMPING APPARATUS FOR SECURING STRIP HEATERS
AND THE LIKE TO CURVED SURFACES
Original Filed Nov. 29, 1962

INVENTOR.
EARL F. VYE

BY
ATTORNEYS

United States Patent Office 3,198,468
Patented Aug. 3, 1965

3,198,468
MAGNETIC CLAMPING APPARATUS FOR SECURING STRIP HEATERS AND THE LIKE TO CURVED SURFACES
Earl F. Vye, 437 El Cajon Drive, San Jose 12, Calif.
Original application Nov. 29, 1962, Ser. No. 241,086, now Patent No. 3,169,184, dated Feb. 9, 1965. Divided and this application Dec. 14, 1964, Ser. No. 418,359
3 Claims. (Cl. 248—206)
(Granted under Title 35, U.S. Code (1952), sec. 266)

This is a division of application, Serial No. 241,086, filed November 29, 1962, now Patent No. 3,169,184.

The invention described herein may be manufactured and used by or for the Government of the United States of America for governmental purposes without the payment of any royalties thereon or therefor.

The present invention relates to strip heaters of the type frequently used for preheating surfaces preparatory to welding or other fabrication steps, and, in particular, it features clamping mechanisms for holding the heaters in fixed positions against an underlying surface.

In a number of situations, it becomes desirable to heat a relatively large surface and, for this purpose, it is not unusual to employ what are known as strip heaters, which, in brief, are long, thin plates of a thermally-conductive metal capable of being electrically heated to impart their heat to underlying surfaces against which the plates are held. Such a practice has become widely used in the fabrication and repair of submarine hulls where large hull sections must be welded together, the strips, of course, serving the purpose of providing the heat necessary for the welding.

This practice, however, is recognized as notoriously uneconomical particularly due to the laborious and expensive manner in which it has been necessary to secure the strips in fixed position. Thus, customarily the strips have been spot-welded in place and the welding requires such preliminary steps as erecting of appropriate scaffolding, laying out and marking spots for grinding preparatory to the welding, setting up the grinding equipment and, of course, the fabrication of the straps themselves which, in most cases, are formed of stainless steel and are fitted and bent to fit a particular job following which the straps usually are thrown away or used as scrap. Also, subsequent to the spot welding of these straps, it is necessary to remove them and this operation in itself involves substantial time and effort. Further, the spot welding itself frequently has resulted in injury to the hull sections, such as the blowing of holes in the metal due to chips getting between the strips and the metal or due to the fact that paint present in repair jobs had not been completely removed.

Other procedures for securing the strip heaters have included the steps of stud welding cleats for holding the heaters. In this practice, nuts or the like are threaded into the studs to hold the heaters in place. Obviously, the economics of such a method also are open to question.

It is, therefore, an object of the present invention to provide strip heating apparatus which can be fixed in position without the need for spot or stud welding.

A further object is to provide strip heating apparatus which is capable of functioning in such a manner that it can be repeatedly employed on different jobs without the necessity of preparing special strips for each operation and the further wasteful requirement of scraping the strips after each use.

Another object is to provide a novel clamping mechanism for maintaining the strips in fixed position for pre-heating purposes.

Still another object is to provide a unitary bank of strip heaters and, further, to provide such a bank in which the components are readily replaceable such, for example, as is required when a heater or another component becomes defective.

A further general object is to provide special types of magnetic clamps for use in such heating operation, the clamps being of simple, well balanced construction so as to be readily and economically fabricated and assembled on a mass production basis.

Another more particular object of the present divisional application is to provide magnetic clamping apparatus consistent with the foregoing objectives and further characterized by possessing a capability of extra heavy-duty holding force as well as the ability to hold the elongate strips firmly against curved underlying surfaces.

Further objects and advantages will become more readily apparent in the detailed description which is to follow.

According to the present invention, the clamping mechanism of the invention is provided by a U-shaped structure in which the base or web of the U carries an adjustable load arm, while the legs of the U project downwardly a sufficient distance to straddle a strip heater and hold the structure to the particular surface to be heated or otherwise treated. To provide the legs with the necessary holding force, each of the legs is magnetically polarized in a like direction, and, more suitably, these leg portions are formed of a soft magnetic material such as iron. Also, a hard magnetic material, such as Alnico V is employed in conjunction with the iron pole pieces to assure permanency of the magnetic attraction. As will be apparent, such a construction assures the greatest magnetic advantage and provides adequate strength for holding the strips securely to the underlying surface. Other features of the invention contemplate the provision of pivotally-mounted pairs of heavy duty U-shaped magnetic structures, the pivotal mounting enabling use of the mechanisms on curved underlying surfaces.

The invention as illustrated in the accompanying drawings of which

Figure 1:
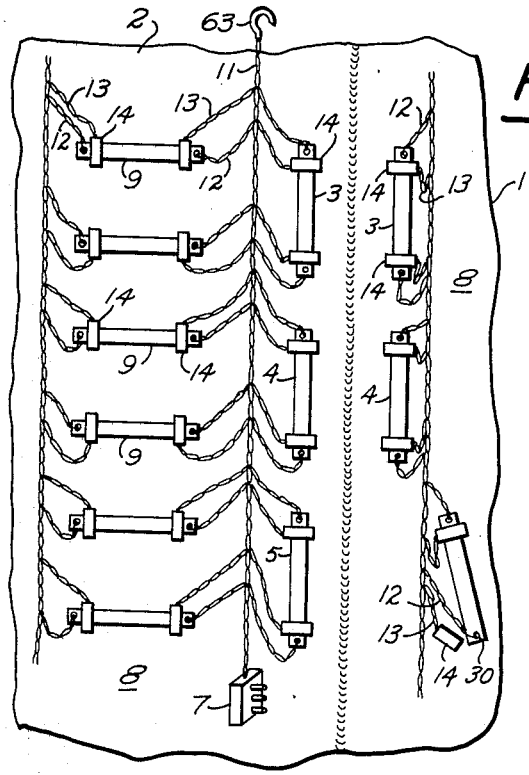
FIG. 1 illustrates fragmentarily a pair of submarine hull sections in position to be butt-welded and a bank of heaters constructed and arranged in accordance with the present invention.

Referring to the drawings and, in particular, to FIG. 1, it will be seen that the operation illustrated is one of butt-welding two submarine hull sections 1 and 2, and, as has been explained, it first is necessary to pre-heat the areas around the butt-weld before the sections are joined together. Although the present invention is especially useful in this particular fabrication process, it is by no means limited to welding practices and many other applications both in industry and in government will be found beneficial.

To accomplish the pre-heating, conventional heater strips 3, 4, 5 etc., are arranged in close proximity to the butt-weld and heat is electrically applied to these strips through standard heater outlets 7 which, of course, are coupled to a power source. The strips themselves are of various sizes depending upon a particular application, although, as will be seen, they are relatively thin, flat and elongate metal strips formed of a thermally conductive metal which also is electrically resistant to generate the heat to be imparted to the underlying surface of the hull section. For purposes of description, the surfaces of the hull section are designated by numeral 8.

It also may be noted in FIG. 1 that other heater strips 9 are disposed against surfaces 8 at right angles to strips 3, 4, 5, etc., and that all of the strips are coupled by a main chain or stringer 11 and by relatively short chain lengths 12 and 13 which will be described subsequently and in greater detail. The rather obvious purpose of this arrangement is to provide a unitary arrangement of strip-heating apparatus to facilitate the setting up for the job as well as its break down operations.

One of the features of the invention is provided by a novel clamping mechanism 14 used to position the strip-heaters in the illustrated positions against surfaces 8. It is contemplated that various forms of these clamps may be employed, the particular form depending to a degree on the nature of the job to be performed and the size and weight of the strip heaters. For example, it sometimes is required to fasten the strips against curved surfaces or the strips may be arranged in vertical or horizontal positions which involve varying holding forces. The clamp forms to be described are specially directed at the particular applications which will be identified. However, they also will be found appropriate in a variety of applications some of which may have no concern with welding.

Figure 2:
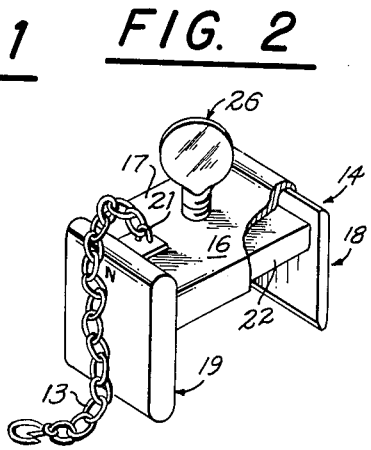
FIG. 2 is a perspective of one type of clamping apparatus employed in the invention, part of the casing of the unit being broken away to illustrate underlying structure.
Figure 3:
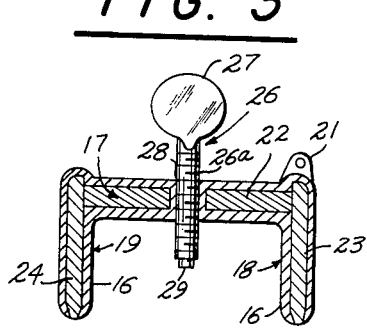
FIG. 3 is a central vertical section through the clamping apparatus of FIG. 2.
Figure 4:
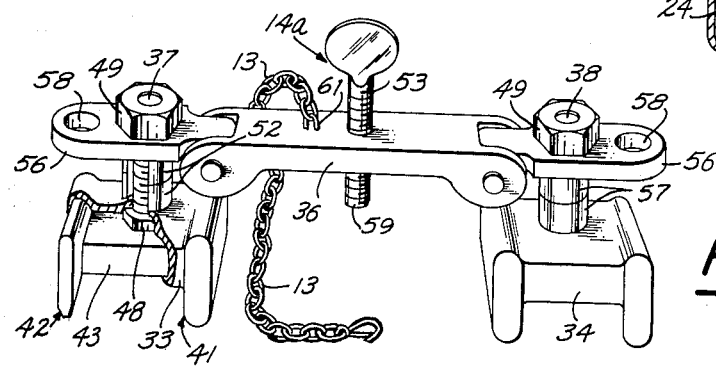
FIG. 4 illustrates in perspective another type of clamping apparatus having a pair of magnetic assemblies one of which has its casing partially broken away.
Figure 5:
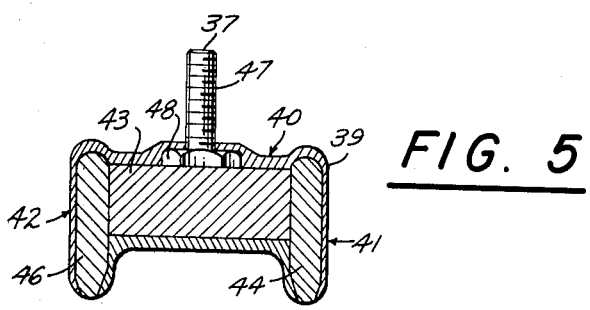
FIG. 5 is a central vertical section through one of the magnetic assemblies of FIG. 5.

The clamping apparatus illustrated in FIGS. 2 and 3 is ideally suited for holding heaters against overhead areas or for use where the heaters are to be mounted in close proximity one to the other. This species, however, forms the subject matter of the original application Serial No. 241,086, although a general understanding of its structure and function should assist in understanding the presently claimed structure which, as will be noted, is illustrated in FIGS. 4 and 5. As will be noted, this mechanism 14 is formed with an external aluminum, die cast casing 16 which almost encompasses the entire magnetic assembly. More specifically, casing 16 is shaped as an inverted U with a web portion 17 and downwardly extending legs 18 and 19. The casing is continuous except for the bottom tip of legs 18 and 19 which are left open for purposes which will become apparent. Preferably casing 16 is of about 1/16" thickness and it is formed at its upper left hand portion with a small pad-eye 21 by means of which it is coupled to short chain lengths 13 so as to detachably connect the clamps into the strip-heater bank. Also, the side of one or both of the legs should be impressed with appropriate indicia such as the letter "N" to identify polarity.

The magnetic assembly of clamp 14 is shown in FIG. 3 where it is seen that the assembly as a whole is provided by a permanent magnetic arrangement formed of a slug or section 22 of a hard magnetic material or alloy such as Alnico V, this Alnico section being mounted in web portion 17 of the casing. Also, legs 18 and 19 of the casing are formed with central cavity in which are disposed sections 23 and 24 which are formed of a relatively soft magnetic material, such as iron or other ferro-magnetic alloys, these sections providing pole pieces which, as seen in FIG. 2, have their lower ends tapered inwardly as well as being exposed to the exterior through the casing openings which, as previously indicated, are provided at the bottom of each of the legs. The Alnico V section 22 and the pole pieces fit closely together within the casing at their meeting portions and, as will be apparent, the pole pieces are polarized in like directions so as to each exert a like force on a ferrous metal surface, such as surfaces 8 of the hull sections of FIG. 1.

The structure of clamping mechanism 14 is completed by mounting a so-called load arm 26 intermediate of the legs in web portion 17. More specifically, load arm 26 essentially is a jack screw having a threaded shank 26a and a flat head portion 27 by means of which the screw can be turned to extend or retract it in its mounted position. The screw is received in a threaded opening 28 provided in casing 16 and, it is also important to note that lower end 29 of the shank is reduced in size with an unthreaded exterior surface, this structural feature having operational advantages to be described. Another apparent factor necessitated by the presence of load arm 26 is that permanent magnet section 22 should be provided with a central bore to accommodate the special interior construction of the casing.

In operation, clamping mechanism 14 may be placed over a strip heater 3, 4, 5, 9, etc., in a straddling position so that its legs extend downwardly on either side of the strip to place the lower ends of its pole pieces 23 and 24 in contact with ferrous metal surfaces 8. In this position, load arm 26 will overlie the strip heater and clamping force can be obtained by advancing the load arm into forceful engagement with the top surface of the strip heater. One notable feature, however, is that load arm 26 does not simply contact the exterior surface of the strip heater but instead projects into special openings 30 which are formed at either end of the strips, see FIG. 1. In this manner, clamps 14 positively hold the strip heaters against lateral or longitudinal movement. Also, the load arms themselves act in a customary manner to exert inward force necessary to secure the strips in flush engagement with the underlying surface.

The magnetic assembly constructed in the manner described can be made to provide adequate holding force for most strip heater operations. In practice, this particular assembly has been made of a relatively small size, the pole pieces being approximately 2 inches in height while the Alnico section has a length of about 3 1/4 inches. Using Alnico V and soft iron as magnetic materials, the holding force of such a clamp at a zero air gap is about 110 pounds. Two such clamping assemblies usually are used for each strip and, as already stated, the particular clamp is best suited for overhead work or for applications in which it is necessary to place the strips in close proximity one to another.

Clamping mechanism 14a, illustrated in FIGS. 4 and 5 is better suited for securing strips to curved surfaces or where extra heavy holding force is required and, as has been noted, this particular species of the invention provides the subject matter of the present invention. For example, the holding force of this particular clamp normally is rated at about 160 pound pull at zero air gap. The structure of clamp 14a is similar in many respects to that of clamp 14, the principal difference being that clamp 14a utilizes a pair of magnetic assemblies 33 and 34 which are suspendably carried from a support base 36 by means of posts 37 and 38.

Magnetic assemblies 33 and 34, essentially are structural equivalents of the magnetic assembly of clamping mechanism 14 in that they also have an aluminum casing 39 having a web portion 40 and legs 41 and 42, web 40 incorporating a section of Alnico V magnetic material 43 (FIG. 5) and legs 41 and 42 each incorporating soft iron pole pieces 44 and 46. One difference is that section 43 is a solid piece of material rather than having the structurally-required central bore of the Alnico piece of clamping mechanism 14. Posts 37 and 38 which support the magnetic assemblies are in the form of square bolts having exterior threads 47 the posts being secured to the central upper portion of web portions 40 by means of nuts 48. As will be noted in FIG. 4, posts 37 and 38 are coupled to base support 36 by a standard nut 49 and, in addition, aluminum spacer rings 52 are employed between the magnetic assembly and the underside of support 36.

Support 36 also mounts a load arm 53 which is identical to load arm 26 of the clamping mechanism 14 and, if desired, several threaded openings can be provided in a side by side disposition along support 36 to permit lateral adjustability of the load arm.

A further feature of clamping mechanism 14a is that it is adapted for securing heater strips on curved surfaces, this being permitted by the hinge leaf construction of support 36. More specifically, hinge leaf 56 is pivotly mounted at each end of the support 36 so that magnetic assemblies 33 and 34 can pivot about the axis of the hinge to conform to curved surfaces. Also, each of the hinge leaves is provided with a pair of openings 58 to permit lateral adjustment of the magnetic assemblies.

Obviously, clamp 14a is utilized much in the same manner as clamp 14 in that it is placed in a straddling position over the strip heaters and load arm 53 then extended to provide the necessary clamping force. Load arm 53 also has a reduced end portion 59 to engage previously-mentioned openings 30 provided in the strips. The upper surface of support 36 also is provided with a small pad eye 61 to provide for the chain connection into the unitary bank of strip heaters.

Referring again to FIG. 1, it will be noted that the clamping mechanism 14 is employed in this particular application. These clamps are entirely suitable for this application since the average heater weighs about 9½ pounds and two of the clamps easily can hold it in place. If the heaters are considerably heavier, or if unusual forces are otherwise anticipated, the clamping mechanism 14a can be employed and, of course, the magnetic holding force of either of the clamps can be materially increased if so desired. Part of the present objectives, however, are to provide a light weight, easily-handled unitary arrangement, so that it is preferable to limit the size of the clamps so as to provide only the necessary force.

The chain connected assembly is particularly advantageous in facilitating the entire operation and thus reducing the cost of both labor and material. As previously indicated, this unitary construction is achieved by linking together a bank of strip heaters by means of main chains 11 and short link chains 12 and 13. These chains are of light weight construction although main chain 11 can vertically support a bank of heaters of several hundred feet length. Most suitably, the chains are of an anchor snap-on variety so that they can be connected and disconnected to suit varying conditions. For example, the heaters frequently have to be removed and replaced two or three times during a welding operation and this can be done quickly and easily by lifting off the magnetic clamps and unsnapping the chain from the heater. Also, the heaters sometimes burn out during use and the snap-on linkage permits easy replacement. Another advantageous factor is that each of chains 11 incorporate at their upper ends hardened steel hooks 63 which, when the bank of heaters is to be employed in a vertical position can be hooked over the upper edge of hull sections 1 and 2 so as to support the entire assembly. Consequently, an operator simply places the suspended strip heaters in their desired location, following which he can use an available linked clamp to secure this strip in this position. For this purpose, chains 13 which couple the clamps to main chain 11 are secured to chain 11 at a point approximate to a connection of short chain 12. In this manner all of the components are readily available to the operator and the assembly time is materially increased with a substantially reduced labor cost. Other obvious advantages in the use of a unitary bank of heaters is the availability of all needed components in one connected assembly. In other words, the units can be stored in their inter-connected relationship so as to avoid loss of parts and quickly facilitate issuance and use of the components needed for a particular task. The main chain, of course, will be of a particular length, but the number of heaters and clamps employed can be entirely optimal.

Obviously many modifications and variations of the present invention are possible in the light of the above teachings. It is therefore to be understood that within the scope of the appended claims the invention may be practiced otherwise than as specifically described.

What is claimed is:

1. Clamping apparatus for securely holding strip heaters in fixed positions on a ferrous metal plate comprising:
   an elongate base having a central transverse opening, and
   a magnetic assembly pivotably mounted on a horizontal axis at each end of said base,
   each of said assemblies including:
   a non-ferrous U-shaped casing having a hollow web portion and downwardly-extending hollow open-bottomed legs,
   a section of hard magnetic material filling said hollow web portion,
   sections of soft magnetic material filling said hollow legs with magnetic face portions projecting into said open bottoms and with upper portions disposed flushly against the outer ends of said hard magnetic section, said assemblies extending downwardly of the base and being spaced one from another a sufficient distance for straddling said strip heater, and
   a load bar adjustably mounted in said base opening and extending downwardly of said base toward said straddled heater,
   said load bar having its lower end portion formed for insertibly engaging said straddled heater and clamping the heater against said ferrous metal plates.

2. The apparatus of claim 1 wherein each of said magnetic assemblies includes:
   a hinge leaf pivotally hung on said axis,
   a post carried by and extending downwardly from said leaf, and
   means coupling the lower end of said post to a central part of said casing web for supporting said casing and its encased parts.

3. The apparatus of claim 2 wherein each of said leaves is provided with additional post support means whereby the lateral position of said post relative to said leaf may be varied.

References Cited by the Examiner

UNITED STATES PATENTS

| | | | |
|---|---|---|---|
| 2,733,492 | 2/56 | Copell | 24—255 |
| 2,772,804 | 12/56 | Byrness | 220—24 |
| 2,884,698 | 5/59 | Wursch | 248—206 |
| 3,047,704 | 7/62 | Van Noy et al. | 219—19 |
| 3,088,573 | 12/62 | Sidwell | 33—1 |

CLAUDE A. LE ROY, *Primary Examiner.*